US008572090B2

(12) United States Patent
Im

(10) Patent No.: US 8,572,090 B2
(45) Date of Patent: Oct. 29, 2013

(54) SYSTEM AND METHOD FOR EXECUTING PROGRAM IN LOCAL COMPUTER

(75) Inventor: Kyoo Min Im, Seoul (KR)

(73) Assignee: NHN Corporation, Seongnam-si (KR)

( * ) Notice: Subject to any disclaimer, the term of this patent is extended or adjusted under 35 U.S.C. 154(b) by 667 days.

(21) Appl. No.: 12/295,623

(22) PCT Filed: Feb. 22, 2007

(86) PCT No.: PCT/KR2007/000924
§ 371 (c)(1),
(2), (4) Date: Sep. 30, 2008

(87) PCT Pub. No.: WO2007/114562
PCT Pub. Date: Oct. 11, 2007

(65) Prior Publication Data
US 2009/0119269 A1    May 7, 2009

(30) Foreign Application Priority Data
Apr. 6, 2006   (KR) .................. 10-2006-0031528

(51) Int. Cl.
G06F 17/30 (2006.01)
(52) U.S. Cl.
USPC ........................................................ 707/741
(58) Field of Classification Search
USPC ................................................. 707/741, 796
See application file for complete search history.

(56) References Cited

U.S. PATENT DOCUMENTS

| 6,862,733 | B1 * | 3/2005 | Abhyankar et al. | 719/310 |
| 7,735,021 | B2 * | 6/2010 | Padawer et al. | 715/810 |
| 2006/0168563 | A1 * | 7/2006 | Muller et al. | 717/120 |
| 2006/0287983 | A1 * | 12/2006 | Krauss et al. | 707/3 |

FOREIGN PATENT DOCUMENTS

| CN | 1146819 | 4/2004 |
| JP | 06-075841 | 3/1994 |
| JP | 14-032401 | 1/2002 |
| JP | 18-072705 | 3/2006 |
| KR | 2005-0054798 | 6/2005 |
| KR | 2006-0001891 | 1/2006 |

OTHER PUBLICATIONS

Lifehacker, Turn off indexing and speed up Windows XP, Jan. 28th, 2005, pp. 1.*
Microsoft, Windows XP Professional Service Pack 3, 2002, pp. 1-5.*
Madoka Emiko, "Tomorrow's Windows for Tomorrow," PC Fan, Feb. 1, 1998, 5.2., pp. 172-177.

* cited by examiner

Primary Examiner — Jorge A Casanova
(74) Attorney, Agent, or Firm — H.C. Park & Associates, PLC

(57) ABSTRACT

Disclosed herein is a method and system for executing a program in a local computer, in which a shortcut index data is indexed and recorded by using the title name of a shortcut file stored in a local computer, a query is received from a user, and then a shortcut file associated with the query is immediately executed. According to exemplary embodiment of the present invention, the system comprises an index component configured to index data associated with a shortcut file stored in a local computer, a shortcut index database configured to record the indexed shortcut index data, an input component configured to receive a query from a user, a retrieval component configured to retrieve the shortcut index data associated with the query from the shortcut index database, and an executing component configured to execute a shortcut file associated with the retrieved shortcut index data.

20 Claims, 4 Drawing Sheets

SYSTEM AND METHOD FOR EXECUTING PROGRAM IN LOCAL COMPUTER

CROSS REFERENCE TO RELATED APPLICATIONS

This application is a U.S. National Phase Application of International Application PCT Application No. PCT/KR2007/000924 filed on Feb. 22, 2007, which claims the benefit of priority from Korean Patent Application No. 10-2006-0031528 filed on Apr. 6, 2006. The disclosures of International Application PCT Application No. PCT/KR2007/000924 and Korean Patent Application No. 10-2006-0031528 are incorporated herein by reference.

TECHNICAL FIELD

The present invention relates to a method and system for executing a program in a local computer in which shortcut index data is indexed and recorded by using the title name of a shortcut file stored in a local computer, a query is received from a user, and then the shortcut file related to the query is immediately executed.

BACKGROUND ART

There has arisen a need for searching a local computer for data in a desktop or a notebook, since the storage space of a personal computer such as a desktop, a notebook, etc., is significantly increased, as well as many documents, pictures, e-mails, messenger contexts, moving pictures, or files including music, and the like, are being stored in the storage space, such as desktop, or notebook, and the like.

When a user wishes to retrieve a file stored in a local computer, the user has to enter the file name as a search word by using a file-searching function provided in an Operation System (OS), and the like. However, it is practically impossible for the user to remember all file names of a plurality of files stored in the local computer. For example, when a user of a local computer prepares and stores a review with respect to a movie whose title is "Island" by using a word processor and wishes to retrieve the review with respect to the movie title "Island" stored in somewhere in the local computer a couple of years later, the user has to exactly enter the file name of the file where the review has been stored in a search box.

Also, in a conventional Windows environment, a user used to independently retrieve an executable file (.exe) and click thereon or click on an icon such as a desktop, a start menu, etc., so as to execute the desired program. Particularly, the user had to click on the desktop icon or retrieve a corresponding executable file and click thereon by closing the opened window in order to execute other programs when many programs are executed.

FIG. 1 illustrates an example for retrieving a program in a local computer according to a conventional art.

As shown in FIG. 1, when a user enters a query "GOM PLAYER", a local computer searches for whether the query "GOM PLAYER" is included in file names or file context previously stored, and then provides the result. However, since the query "GOM PLAYER" is a program name, the program corresponding to the query entered as the program name cannot be found through the file-searching function provided in a local computer. Thus, the local computer cannot provide any search results corresponding to the query "GOM PLAYER".

Generally, in Windows programs, program connection information and specific icons are relevant to a shortcut file (.lnk file) for executing a program, so that a user can execute a shortcut file through the program connection information and specific icons.

However, there is a burden or inconvenience in that, each time the user executes the program, the program must be executed only through the program connection information and specific icons, and the user must check each individual executable file in the case where there is not a corresponding icon in the desktop.

Further, there still occurs a problem in that the executable file cannot be found by means of the file-searching function of the conventional Windows. Particularly, although there is Korean program information in the case of homemade programs, there is not provided functional support for the homemade programs. For this reason, a user executes a program only through icon-clicking out of habit.

Accordingly, there is a great need for a method and system for executing a program in a local computer in which a program is readily retrieved and executed by using a program name similar to a typical file-searching function.

DISCLOSURE OF INVENTION

Technical Goals

An aspect of the present invention provides a method and system for executing a program in a local computer in which a shortcut index associated with a shortcut file name stored in a local computer is separately indexed and stored, so that a user retrieves a desired file so as to execute the file by using the shortcut file name.

Another aspect of the present invention provides a method and system for executing a program in a local computer, in which when a user enters the program connection information or name of a shortcut file and pushes an executing button, the shortcut file is directly executed by using shortcut index data having been indexed.

Still another aspect of the present invention provides a method and system for executing a program in a local computer in which a corresponding program is retrieved and executed by merely entering a program name (title name) in a search box and then sending a search request, unlike a conventional method in which a specific icon must be clicked to execute a program.

Yet another aspect of the present invention provides a method and system for executing a program in a local computer in which a processing load of the system is checked, and shortcut index data is indexed when in the idle state.

Technical Solutions

According to an aspect of the present invention, there is provided a system for executing a program in a local computer, the system comprising an index component configured to index data associated with a shortcut file stored in a local computer, a shortcut index database configured to record the indexed shortcut index data, an input component configured to receive a query from a user, a retrieval component configured to retrieve the shortcut index data associated with the query from the shortcut index database, and an executing component configured to execute a shortcut file associated with the retrieved shortcut index data.

According to another aspect of the present invention, there is provided a method for executing a program in a local computer, the method comprising the steps of indexing shortcut index data associated with a shortcut file stored in a local computer, recording the indexed shortcut index data in a shortcut index database, receiving a query from a user, retrieving shortcut index data associated with the query from the shortcut index database, and executing a shortcut file associated with the retrieved shortcut index data.

Here, the local computer includes all apparatuses including a microprocessor and a storage device, such as a desktop computer, a notebook computer, a laptop computer, a personal digital assistant (PDA), a mobile phone, and an MP3 player. In this case, the storage device may be a hard disk, a RAM, or a ROM and may be a built-in device or external device.

In addition, the local computer may be a concept including a plurality of computers connected via a local-area network (LAN).

BEST MODE FOR CARRYING OUT THE INVENTION

Figure 1:
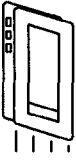
FIG. 1 illustrates an example for retrieving a program in a local computer according to a conventional art.

Reference will now be made in detail to embodiments of the present invention, examples of which are illustrated in the accompanying drawings, wherein like reference numerals refer to the like elements throughout. The embodiments are described below in order to explain the present invention by referring to the figures.

Figure 2:
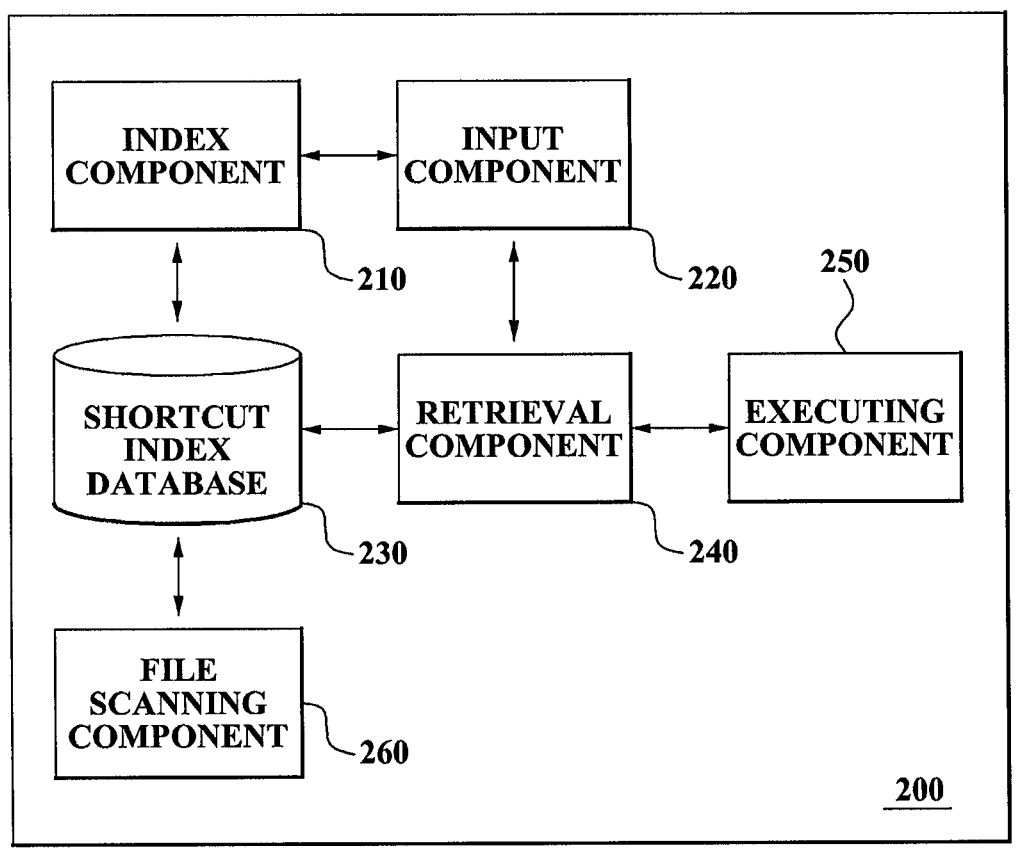
FIG. 2 is a block diagram illustrating a system for executing a program in a local computer according to an exemplary embodiment of the present invention.

FIG. 2 is a block diagram illustrating a system for executing a program in a local computer according to an exemplary embodiment of the present invention.

As shown in FIG. 2, a system for executing a program in a local computer 200 comprises an index component 210 configured to index data associated with a shortcut file stored in a local computer; a shortcut index database 230 configured to record the indexed shortcut index data; an input component 220 configured to receive a query from a user; a retrieval component 240 configured to retrieve the shortcut index data associated with the query from the shortcut index database; and an executing component 250 configured to execute a shortcut file associated with the retrieved shortcut index data. Here, the executing component 250 executes the shortcut file by using program connection information associated with the shortcut file.

According to an exemplary embodiment of the present invention, the system for executing a program in a local computer 200 further comprises a file scanning component 260 configured to retrieve a shortcut file stored in the local computer. The index component 210 indexes shortcut index data associated with the shortcut file, when the idle time of the local computer continues for at least a predetermined time.

According to another exemplary embodiment of the present invention, the index component 210 separately indexes shortcut index data with respect to a shortcut file and records the indexed shortcut index data in the shortcut index database 230 when indexing index data by retrieving a file to be indexed, so that when a query associated with shortcut index data is received from a user, a shortcut file associated with the shortcut index data is directly executed.

Thus, according to the present invention, a corresponding program is retrieved and executed only by entering a program name (title name) in a search box and then sending a search request unlike a conventional art in which a specific icon has to be clicked to execute a program.

Figure 3:
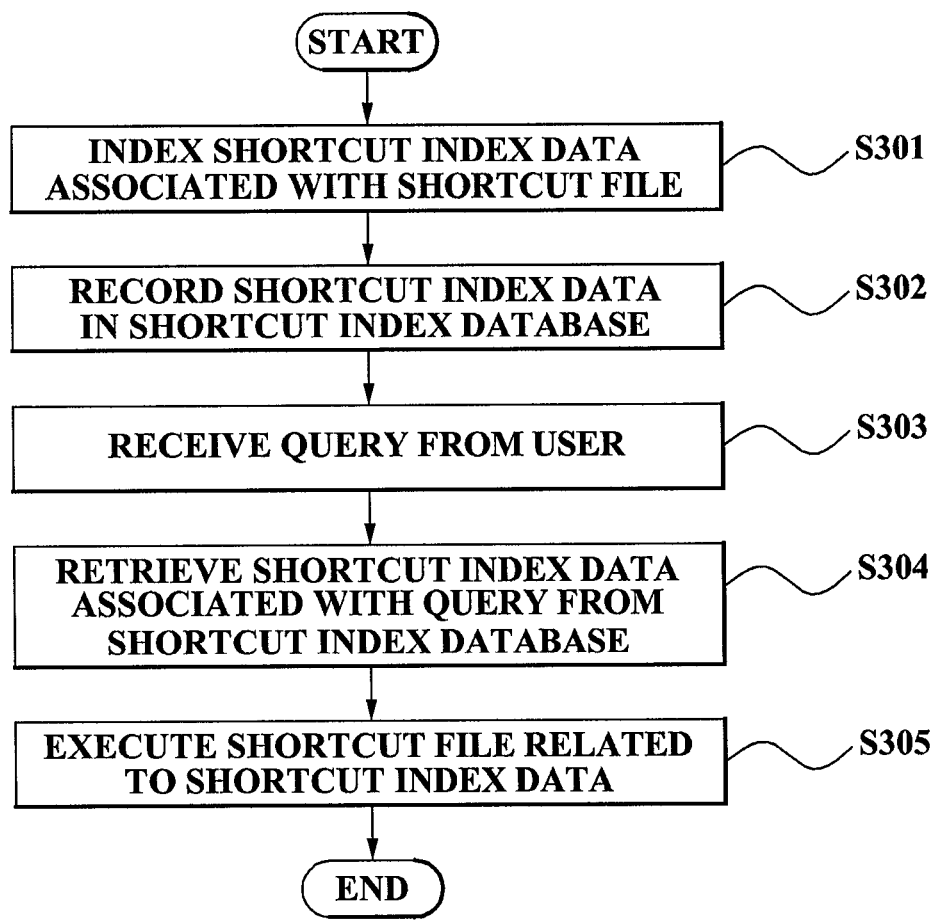
FIG. 3 is a flowchart illustrating a method for executing a program in a local computer according to another exemplary embodiment of the present invention.

FIG. 3 is a flowchart illustrating a method for executing a program in a local computer according to another exemplary embodiment of the present invention. The method for executing a program in a local computer according to the present exemplary embodiment of the invention may be executed in the system for executing a program in the local computer 200 described with reference to FIG. 2.

In operation S301, the index component 210 of the system 200 indexes shortcut index data associated with the shortcut file stored in the local computer. The shortcut file (.lnk) is an extension of the shortcut icon of Windows, and registered in the desktop or a start button instead of an executable file so as to be used, so that a user can execute programs associated with the shortcut file by merely clicking on the shortcut icon. Generally, the shortcut file includes information such as location, name, execution option, and the like, of an executable file connected therewith.

According to an exemplary embodiment of the present invention, the index component 210 indexes the shortcut index data by using the shortcut file name. Here, the shortcut index data can be extracted from the entire or a part of the shortcut file name, from a front part of the shortcut file name, from a rear part of the shortcut file name, or from front and rear parts of the shortcut file name. Accordingly, the shortcut index data can be extracted from what a user readily uses by considering the search inclination of a user.

Further, according to still another exemplary embodiment of the present invention, the index component 210 may index the shortcut index data by using program connection information of the shortcut file. Generally, the directory or file name is used when searching for a file. The program connection information can be extracted as the shortcut index data by considering the searching property as described above. Here, the shortcut index data can be extracted from the entire or a part of the program connection information in the same manner as described above.

Thus, in a conventional Windows environment, a user independently finds an executable file (.exe) and clicks thereon or clicks on an icon such as a desktop, a start menu, etc., so as to execute a desired program. However, in the present invention, a program is readily executed merely by means of the shortcut file name.

According to an exemplary embodiment of the present invention, the system for executing a program in a local computer 200 indexes the shortcut index data by monitoring the idle time of the local computer, and indexes the shortcut index data when the idle time continues for at least a predetermined time. Here, the idle time designates the time period during the use rate or load rate of the local computer by a user or other applications is lower than a predetermined level. Specifically, the idle time designates the time period during which the local computer is not being used for other operations. Thus, the idle time can be utilized in an index operation for the searching of the local computer.

Existence of idle time may be determined by considering Central Processing Unit (CPU) use rate, memory use rate, existence of an operation of an input device, and hard drive use rate. For example, an index operation with respect to the local computer can be performed only when the time period determined as the idle time continues for 15 seconds.

According to another exemplary embodiment of the present invention, the system for executing a program in a local computer 200 further comprises a file scanning component 260 to retrieve a shortcut file stored in the local computer. The index component 210 indexes shortcut index data, when the idle time continues for at least a predetermined time.

In operation S302, the system 200 records the indexed shortcut index data in the shortcut index database 230.

According to an exemplary embodiment of the present invention, the system 200 retrieves not only the shortcut files but also files to be indexed among files stored in the local computer. Here, files to be indexed may include document files, audio files, video files, picture files, messenger context files, e-mails, etc. Particularly, parts of files to be indexed having a specific extension among information of the local computer can be objects to be indexed for the searching of the local computer. The files to be indexed as described above are indexed as index data associated with each file to be indexed, and stored in a predetermined index database.

In the present invention, when index data is indexed by retrieving the file to be indexed, shortcut index data with respect to the shortcut file is separately indexed and recorded in the shortcut index database 230, so that when a query associated with shortcut index data is received from a user, the shortcut file related to the shortcut index data is immediately executed.

In operation S303, the input component 220 of the system 200 receives a query from a user. The query is related to the shortcut index data, which can be the shortcut file name or the program connection information as described above. For example, the user can enter program queries such as "GOM PLAYER", "winamp", "ALzip", "samkukzi", etc., in the input component 220.

According to an exemplary embodiment of the present invention, the system for executing a program in a local computer 200 provides the input component 220 in a form of a general search box provided using the file-searching function in a conventional Windows program, or in a form of a web browser, so that a user can freely enter the query through a search field of a general search box or web browser. Thus, in the case of the general search box, the system 200 provides the search result of the local computer with respect to the inputted query, and in the case of the web browser, provides the search result of the local computer in the form of a web document together with the search result of web pages.

In operation S304, the retrieval component 240 of the system 200 retrieves shortcut index data associated with the query from the shortcut index database 230. For example, when "GOM PLAYER" is inputted as the query, the retrieval component 240 can retrieve shortcut index data associated with "GOM PLAYER".

In operation S305, the executing component 250 of the system 200 executes a shortcut file associated with the retrieved shortcut index data.

The executing component 250 provides the search result when more than one shortcut file is associated with the retrieved shortcut index data, and executes the application of the shortcut file so as to execute the shortcut file when one shortcut file among the search result is selected by a user.

According to an exemplary embodiment of the present invention, when the user enters the query through a web browser, the search result of the local computer is converted into a form of a web document so as to provide the search result in a web document form. Here, the web document may be an HTML (HyperText Markup Language) document, and the search result in the web document form may be items to which a resource is added, such as an image, an expression, and the like, required for the search result of the local computer.

As described above, according to the present invention, when a user inputs the program connection information or name of the shortcut file and pushes an executing button, the shortcut file is directly executed by using a shortcut index data having been indexed.

Figure 4:
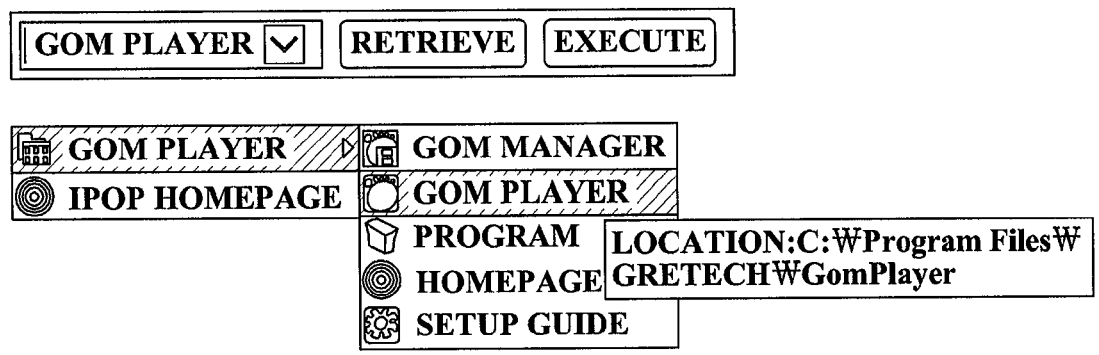
FIG. 4 illustrates an example of the result after performing shortcut file retrieval by using the system for executing the program in the local computer described with reference to FIG. 2.

FIG. 4 illustrates an example of the result after performing shortcut file retrieval by using the system for executing the program in the local computer described with reference to FIG. 2.

As shown in FIG. 4, when a user enters a query "GOM PLAYER" in a search box (input component 220) and pushes a "search" or "executing" button, the system for executing a program in a local computer 200 retrieves shortcut index data associated with "GOM PLAYER" from the shortcut index database 230 so as to provide the corresponding search result (GOM PLAYER, ipop homepage). The user selects one shortcut file which the user wishes to execute among the search results, so that the selected shortcut file is directly executed.

Although not shown, when there is one shortcut file associated with "GOM PLAYER" in the local computer, "GOM PLAYER" is directly executed instead of providing the search result.

Further, although not shown, since shortcut index data is indexed by using the entire or a part of the title name associated with a shortcut file, "GOM PLAYER" of the shortcut file related to "GOM" may be retrieved although the user enters the query "GOM PLAYER".

The method for executing a program in a local computer according to the present exemplary embodiment is implemented in program instruction from that can be generated through a variety of computer means, so that can be recorded in a computer-readable medium. The computer-readable medium may include program instructions, data files, a data structure or a combination thereof. The program instructions recorded in the computer-readable medium may be specially designed and constructed for the present invention, or be well known to those skilled in the field of computer software. Examples of computer-readable medium include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, and the like, including a carrier wave transmitting signals specifying the program instructions, data structures, and the like. Examples of program instructions include both machine code, such as produced by a compiler, and files containing higher level code that may be executed by the computer using an interpreter. The hardware devices may be constructed to act as one or more software modules for performing the operation of the present invention, and vice versa.

As described above, according to the present invention, a shortcut index associated with a shortcut file name stored in a local computer is separately indexed and stored, so that a user can retrieve a desired file so as to execute the file by using the shortcut file name.

According to another aspect of the present invention, when a user enters the program connection information or name of a shortcut file and pushes an executing button, the shortcut file is directly executed by using shortcut index data having been indexed.

According to still another aspect of the present invention, a corresponding program is retrieved and executed by merely entering a program name (title name) in a search box and then sending a search request, unlike a conventional method in which a specific icon must be clicked to execute a program.

According to yet another aspect of the present invention, a processing load of the system is checked, and shortcut index data is indexed when in the idle state.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A system for executing a program in a local computer, the system comprising:
   a processor;
   an index component configured to construct a shortcut index database by indexing information associated with shortcut files stored in a local computer, the shortcut index database comprising the indexed information associated with the shortcut files only;
   one or more memories configured to communicate with the processor, the one or more memories storing the shortcut index database;
   an input component configured to receive a query from a user;
   a retrieval component configured to search the shortcut index database for a shortcut file corresponding to the query; and
   an executing component configured to execute the searched shortcut file,
   wherein the index component is configured to index information associated with the shortcut files linked to executable files, the executable files being files stored in the local computer to run the program, when executed.

2. The system of claim 1, further comprising:
   a file scanning component configured to retrieve shortcut files stored in the local computer.

3. The system of claim 1, wherein the index component indexes the information associated with shortcut files stored in the local computer, when idle time of the local computer continues for at least a time period.

4. The system of claim 1, wherein the index component indexes the information associated with shortcut files by using a title name of the shortcut file, the title name being indicative of a name of the program to be executed.

5. The system of claim 1, wherein the input component receives the query from the user through a web browser.

6. The system of claim 1, wherein the executing component executes the shortcut file by using program connection information related to the shortcut file.

7. The system of claim 1, wherein the retrieval component searches for one or more shortcut files corresponding to the query.

8. The system of claim 7, wherein the executing component provides a search result of the one or more searched shortcut files, and executes one of the shortcut files selected by the user from the search result.

9. The method of claim 1, wherein constructing the shortcut index database comprises storing program connection information of the shortcut files.

10. A method for executing a program in a local computer, the method comprising the steps of:
    constructing a shortcut index database by indexing information associated with shortcut files stored in a local computer, the shortcut index database comprising the indexed information associated with the shortcut files only;
    storing the shortcut index database in a memory;
    receiving a query from a user;
    upon receipt of the query, searching the shortcut index database for a shortcut file corresponding to the query; and
    executing the searched shortcut file,
    wherein constructing the shortcut index database comprises indexing information associated with the shortcut files linked to executable files, the executable files being files stored in the local computer to run the program, when executed.

11. The method according to claim 10, wherein the step of constructing a shortcut index database by indexing information associated with shortcut files comprises the steps of:
    retrieving shortcut files stored in the local computer; and
    indexing information associated with the shortcut files when idle time of the local computer continues for at least a predetermined time.

12. The method of claim 10, wherein the step of constructing a shortcut index database by indexing information associated with shortcut files indexes the information associated with shortcut files by using a title name of the shortcut file, the title name being indicative of a name of the program to be executed.

13. The method of claim 10, wherein the step of receiving the query from the user includes a step of receiving the query from the user through a web browser.

14. The system of claim 10, wherein the step of executing the searched shortcut file comprises the step of:
    executing the shortcut file by using a program connection information associated with the shortcut file.

15. The system of claim 10, wherein searching the shortcut index database for a shortcut file corresponding to the query searches for one or more shortcut files corresponding to the query.

16. The system of claim 15, further comprising the step of providing a search result of the one or more searched shortcut files, wherein the step of executing the searched shortcut file executing one of the shortcut files selected by the user from the search result.

17. The method of claim 10, further comprising:
    determining whether there is one shortcut file or more found in a search result;
    if it is determined that there are more shortcut files than one found in the search result, executing a first shortcut file in response to selection of the first shortcut file from the search result by the user; and
    if it is determined that there is only the one shortcut file in the search result, executing the one shortcut file without the user's selection.

18. The method of claim 17, wherein if it is determined that there is only the one shortcut file in the search result, the one shortcut file is executed without presenting the search result to the user.

19. The method of claim 10, wherein the shortcut files are linked with executable files.

20. One or more computer-readable media having stored thereon a computer program that, when executed by one or more processors, causes the one or more processors to perform acts including:

constructing a shortcut index database by indexing information associated with shortcut files stored in a local computer, the shortcut index database comprising the indexed information associated with the shortcut files only;
storing the shortcut index database in a memory;
receiving a query from a user;
searching the shortcut index database for a shortcut file corresponding to the query; and
executing the searched shortcut file,
wherein constructing the shortcut index database comprises indexing information associated with the shortcut files linked to executable files, the executable files being files stored in the local computer to run a program, when executed.

* * * * *